United States Patent
Banerjee et al.

(10) Patent No.: US 11,281,980 B2
(45) Date of Patent: Mar. 22, 2022

(54) SYSTEMS AND METHODS FOR EXTENDING REASONING CAPABILITY FOR DATA ANALYTICS IN INTERNET-OF-THINGS (IOT) PLATFORM

(71) Applicant: Tata Consultancy Services Limited, Mumbai (IN)

(72) Inventors: Snehasis Banerjee, Kolkata (IN); Mariswamy Girish Chandra, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 170 days.

(21) Appl. No.: 16/558,549

(22) Filed: Sep. 3, 2019

(65) Prior Publication Data
US 2020/0210862 A1    Jul. 2, 2020

(30) Foreign Application Priority Data
Dec. 31, 2018    (IN) .............................. 201821050017

(51) Int. Cl.
*G06F 7/00*      (2006.01)
*G06N 5/04*      (2006.01)
(Continued)

(52) U.S. Cl.
CPC ............ *G06N 5/04* (2013.01); *G06F 16/2443* (2019.01); *G06F 16/2448* (2019.01); *G06F 16/258* (2019.01); *G06F 16/906* (2019.01)

(58) Field of Classification Search
CPC ............. G06F 16/2443; G06F 16/2448; G06F 16/906; G06F 16/258; G06N 5/025; G06N 5/04
See application file for complete search history.

(56) References Cited

U.S. PATENT DOCUMENTS 5,778,150 A * 7/1998 Chan .................. G06N 5/04
706/46
9,990,187 B1 * 6/2018 Carroll .................... G06F 8/30
(Continued)

OTHER PUBLICATIONS

Nikolov, A. et al. "Towards Data Fusion in a Multi-ontology Environment," *Proceedings of the WWW 2009 Workshop on Linked Data on the Web*, Apr. 20, 2009; 5 pages.

*Primary Examiner* — Mohammed R Uddin
(74) *Attorney, Agent, or Firm* — Finnegan, Henderson, Farabow, Garrett & Dunner, LLP

(57) ABSTRACT

Systems and methods for extending reasoning capability for data analytics in Internet of Things (IoT) platform(s) are provided. Traditional systems and methods for executing IoT analytics tasks suffer as IoT analytics techniques are generated in different programming language platforms, and this leads to a manual intervention or an asynchronous and sequential analysis of IoT analytics task(s). Embodiments of the method disclosed provide for overcoming the limitations faced by the traditional systems and methods by dynamically creating procedural functions from a plurality of programming languages upon determining an absence of predefined procedural functions, and extracting, using the dynamically created procedural functions, one or more semantic rules in a real-time, wherein the one or more semantic rules extend a reasoning capability for executing the one or more data analytics tasks in a plurality of IoT platforms.

7 Claims, 5 Drawing Sheets

(51) Int. Cl.
*G06F 16/242* (2019.01)
*G06F 16/906* (2019.01)
*G06F 16/25* (2019.01)

(56) References Cited

U.S. PATENT DOCUMENTS

| | | |
|---|---|---|
| 10,608,953 B2* | 3/2020 | Sivasubramanian ... G06F 9/541 |
| 10,728,340 B2* | 7/2020 | Thummalapalli ... H04L 41/5003 |
| 10,860,950 B2* | 12/2020 | Chu ........................ G06N 20/00 |
| 2012/0143570 A1 | 6/2012 | Austin et al. |
| 2013/0325787 A1 | 12/2013 | Gerken et al. |
| 2017/0083386 A1* | 3/2017 | Wing ..................... G06Q 10/10 |
| 2017/0232300 A1* | 8/2017 | Tran ........................ H04L 67/10 434/247 |
| 2018/0007055 A1* | 1/2018 | Infante-Lopez ....... G06N 20/00 |
| 2018/0018607 A1* | 1/2018 | Kusui ............ G06Q 10/063112 |
| 2018/0060759 A1* | 3/2018 | Chu ........................ G06N 20/00 |
| 2018/0121931 A1* | 5/2018 | Bender ................... H04L 43/08 |
| 2019/0042288 A1* | 2/2019 | Hanumantharau ... G06F 9/4552 |
| 2019/0171187 A1* | 6/2019 | Cella ................. G05B 23/0221 |
| 2019/0244122 A1* | 8/2019 | Li .......................... G06N 5/042 |
| 2019/0349426 A1* | 11/2019 | Smith .................... H04L 45/20 |
| 2020/0374292 A1* | 11/2020 | Rakshit ................... G06N 5/02 |

* cited by examiner

| Function Name | Keywords | Return Type | Input argument count | Casting | Control Flow Adjacency Matrix |
|---|---|---|---|---|---|
| Positive_increment | Int,double, if,return | Int | 1 | yes | A -> B ; A -> C [A representing start, if statement creating two paths between B and C; 1 means edge between nodes exist, 0 means no edge]<br><br>|   | A | B | C |<br>|---|---|---|---|<br>| A | 0 | 1 | 1 |<br>| B | 0 | 0 | 0 |<br>| C | 0 | 0 | 0 | |

FIG. 5

SYSTEMS AND METHODS FOR EXTENDING REASONING CAPABILITY FOR DATA ANALYTICS IN INTERNET-OF-THINGS (IOT) PLATFORM

PRIORITY CLAIM

This U.S. patent application claims priority under 35 U.S.C. § 119 to: India Application No. 201821050017, filed on Dec. 31, 2018. The entire contents of the aforementioned application are incorporated herein by reference.

TECHNICAL FIELD

The disclosure herein generally relates to data analytics, and, more particularly, to systems and methods for extending reasoning capability for data analytics in Internet-of-Things platform.

BACKGROUND

Internet-of-Things (IoT) and related services are poised for a disruptive growth in near future mainly because of huge number of sensor deployments and advances in networking technologies. As data is considered the new 'oil' (fuel) for innovations in Industry, it has been found that data analytics on IoT is in huge demand across all business domains and services around it. The IoT is an inter-networking of physical devices, vehicles, buildings, and other items embedded with electronics, software, sensors, actuators, and network connectivity that enable these objects to collect and exchange data.

The IoT based devices typically gather data and stream it over the Internet to a central source, where it is analyzed and processed. The capabilities of devices connected to the IoT platform continue to advance by combining data into more useful information. Rather than just reporting raw data, connected devices may further be required to send higher-level information back to machines, computers, and people for further evaluation and decision making.

However, the traditional approaches for IoT analytics have been confined to a quantitative analysis of data based on the problem at hand. Thus, the traditional systems and methods for the IoT analytics suffer as IoT analytics techniques are generated in different programming language platforms, and this leads to manual intervention or asynchronous and sequential analysis of an IoT analytics task. Finally, the traditional systems and methods implementing reasoning enabled analytics system suffer from a lack of support of procedural evaluations and keeping check of facts that have turned obsolete or false.

SUMMARY

Embodiments of the present disclosure present technological improvements as solutions to one or more of the above-mentioned technical problems recognized by the inventors in conventional systems. For example, in one embodiment, a method for extending reasoning capability for data analytics in Internet of Things (IoT) platform, the method comprising: receiving, by one or more hardware processors, a set of information on one or more data analytics tasks to be executed from a plurality of sources; determining, by the one or more hardware processors, a presence of one or more pre-defined procedural functions in the set of information for executing the one or more data analytics tasks; performing, based upon the determining, one of: executing, via a first set semantic rules, the one or more data analytics tasks upon determining the presence of the one or more pre-defined procedural functions in the set of information, wherein the first set semantic rules are extracted using the one or more pre-defined procedural functions; and dynamically creating an another set of procedural functions upon determining an absence of the one or more pre-defined procedural functions in the set of information, wherein the another set of procedural functions comprise integrated procedural functions from a plurality of programming languages, and wherein the dynamically creating comprises extracting, using the another set of procedural functions, a second set semantic rules in a real-time, wherein the second set of semantic rules extend a reasoning capability for executing the one or more data analytics tasks in a plurality of IoT platforms; assigning, using one or more pre-defined templates, a Uniform Resource Identifier (URI) to each of the another set of procedural functions to identify one or more functions with an identical name; using an assigned Uniform Resource Identifier (URI), a semantic rule extension complaint function wrapper for executing the one or more data analytics tasks in the plurality of IoT platforms; generating, using the set of information, a set of scores by mapping a plurality of identical control flow codes from the plurality of programming languages; and representing the each of the plurality of identical control flow codes by a vector space representation technique for determining the presence of the one or more pre-defined procedural functions.

In another aspect, there is provided a system for extending reasoning capability for data analytics in Internet of Things (IoT) platform, the system comprising a memory storing instructions; one or more communication interfaces; and one or more hardware processors coupled to the memory via the one or more communication interfaces, wherein the one or more hardware processors are configured by the instructions to: receive a set of information on one or more data analytics tasks to be executed from a plurality of sources; determine a presence of one or more pre-defined procedural functions in the set of information for executing the one or more data analytics tasks; perform, based upon the determining, one of: execute, via a first set semantic rules, the one or more data analytics tasks upon determining the presence of the one or more pre-defined procedural functions in the set of information, wherein the first set semantic rules are extracted using the one or more pre-defined procedural functions; and dynamically create an another set of procedural functions upon determining an absence of the one or more pre-defined procedural functions in the set of information, wherein the another set of procedural functions comprise integrated procedural functions from a plurality of programming languages, and wherein the dynamically creating comprises extracting, using the another set of procedural functions, a second set semantic rules in a real-time, wherein the second set of semantic rules extend a reasoning capability for executing the one or more data analytics tasks in a plurality of IoT platforms; dynamically create the another set of procedural functions by assigning, using one or more pre-defined templates, a Uniform Resource Identifier (URI) to each of the another set of procedural functions to identify one or more functions with an identical name; generating, using an assigned Uniform Resource Identifier (URI), a semantic rule extension complaint function wrapper for executing the one or more data analytics tasks in the plurality of IoT platforms; generate, using the set of information, a set of scores by mapping a plurality of identical control flow codes from the plurality of programming languages for extracting the second set semantic rules; represent, by a vector space representation technique, the plurality of identical control flow codes for determining the presence of the one or more pre-defined procedural functions.

In yet another aspect, there is provided one or more non-transitory machine readable information storage mediums comprising one or more instructions which when executed by one or more hardware processors causes the one or more hardware processors to perform a method for for extending reasoning capability for data analytics in Internet of Things (IoT) platform, the method comprising: receiving a set of information on one or more data analytics tasks to be executed from a plurality of sources; determining a presence of one or more pre-defined procedural functions in the set of information for executing the one or more data analytics tasks; performing, based upon the determining, one of: executing, via a first set semantic rules, the one or more data analytics tasks upon determining the presence of the one or more pre-defined procedural functions in the set of information, wherein the first set semantic rules are extracted using the one or more pre-defined procedural functions; and dynamically creating an another set of procedural functions upon determining an absence of the one or more pre-defined procedural functions in the set of information, wherein the another set of procedural functions comprise integrated procedural functions from a plurality of programming languages, and wherein the dynamically creating comprises extracting, using the another set of procedural functions, a second set semantic rules in a real-time, wherein the second set of semantic rules extend a reasoning capability for executing the one or more data analytics tasks in a plurality of IoT platforms; assigning, using one or more pre-defined templates, a Uniform Resource Identifier (URI) to each of the another set of procedural functions to identify one or more functions with an identical name; using an assigned Uniform Resource Identifier (URI), a semantic rule extension complaint function wrapper for executing the one or more data analytics tasks in the plurality of IoT platforms; generating, using the set of information, a set of scores by mapping a plurality of identical control flow codes from the plurality of programming languages; and representing the each of the plurality of identical control flow codes by a vector space representation technique for determining the presence of the one or more pre-defined procedural functions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 illustrates an example vector space representation in a tabular form, in accordance with some embodiments of the present disclosure.

DETAILED DESCRIPTION

Figure 1:
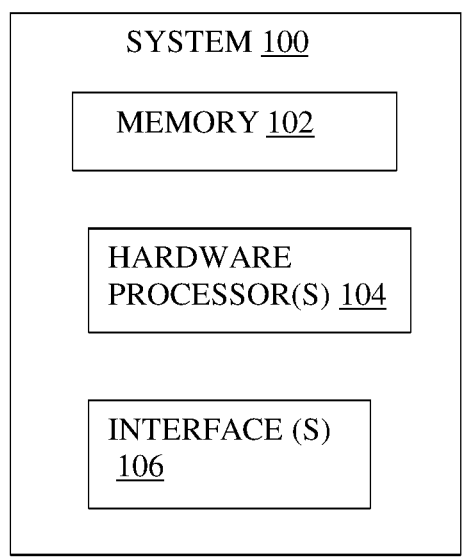
FIG. 1 illustrates block diagram of a system for extending reasoning capability for data analytics in Internet of Things (IoT) platform, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide systems and methods for extending reasoning capability for data analytics in Internet of Things (IoT) platform. Computer Reasoning relies on precise rules from a set of well-formed statements. One way to classify reasoning approaches is in terms of monotonicity. In case of Non-monotonic reasoning (such as truth maintenance system), facts may become false in future, which directly relates to practical scenarios. This requires monitoring of facts so that when a fact becomes invalid because of a context change, facts derived as a consequence of that fact is removed and so on as a chain reaction. Reasoning techniques involves working with predicates and facts. Functional predicates are useful when in a reasoning enabled system, procedural evaluation is needed to evaluate inferences based on dynamic facts.

Knowledge plays a crucial role in data analytics. Most of the time, the solutions are dependent on knowledge of domain, algorithms and application. The data analysts use the knowledge to filter out non-consistent models as well as apply correct steps in deriving inferences from data at hand. In IoT task(s), three types of ontologies are mainly used comprising a domain, that express background knowledge about the application domain, ontologies for data analytics process, that define knowledge about the data mining process, its steps and algorithms and their possible parameters, and metadata ontologies, that describe meta knowledge about the data, such as provenance, format and source.

The traditional approaches for IoT Analytics have confined themselves to a quantitative analysis of the data based on the problem at hand. Further, different suites of algorithms are available in different programming language platforms and this leads to manual intervention or asynchronous and sequential analysis of IoT task(s). Also, a limited number of IoT based applications utilize semantic technologies or in general symbolic techniques of analysis.

The method disclosed attempts to overcome the above mentioned limitations faced by the traditional systems and methods. For example, the method disclosed integrates the symbolic and quantitative techniques suitable for a typical IoT Analytics workflow execution, and separates the logic from generic procedures and storing them in rules, ontologies and knowledge stores. The method disclosed also provides for a seamless integration of procedural execution into the heart of reasoning following software engineering principles.

The method disclosed also provides for a platform wherein functions written in one or more known programming languages, for example, Java™ can be instantly added to a reasoning registry, thereby decreasing development time as well as keeping the underlying implementation transparent. The method disclosed further allows a collaborative development of procedural reasoning functions, testing, validation and ratings, and finally provides a support for analytics on extended functions like time and space requirements, frequency of usage, modification, extension that may help in providing better services.

Referring now to the drawings, and more particularly to FIG. 1 through 5, where similar reference characters denote corresponding features consistently throughout the figures, there are shown preferred embodiments and these embodiments are described in the context of the following exemplary system and/or method.

FIG. 1 illustrates an exemplary block diagram of a system 100 for extending reasoning capability for data analytics in the IoT platform, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 102. In an embodiment, the system 100 can be implemented in a variety of computing systems, such as laptop computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 can be configured to store any data that is associated with the extending of reasoning capability for data analytics in the IoT platform. In an embodiment, the information pertaining to pre-defined procedural functions, semantic rules, dynamically created procedural functions etc. is stored in the memory 102. Further, all information (inputs, outputs and so on) pertaining to the extending of reasoning capability for data analytics in the IoT platform, may also be stored in the database, as history data, for reference purpose.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

Figure 2:
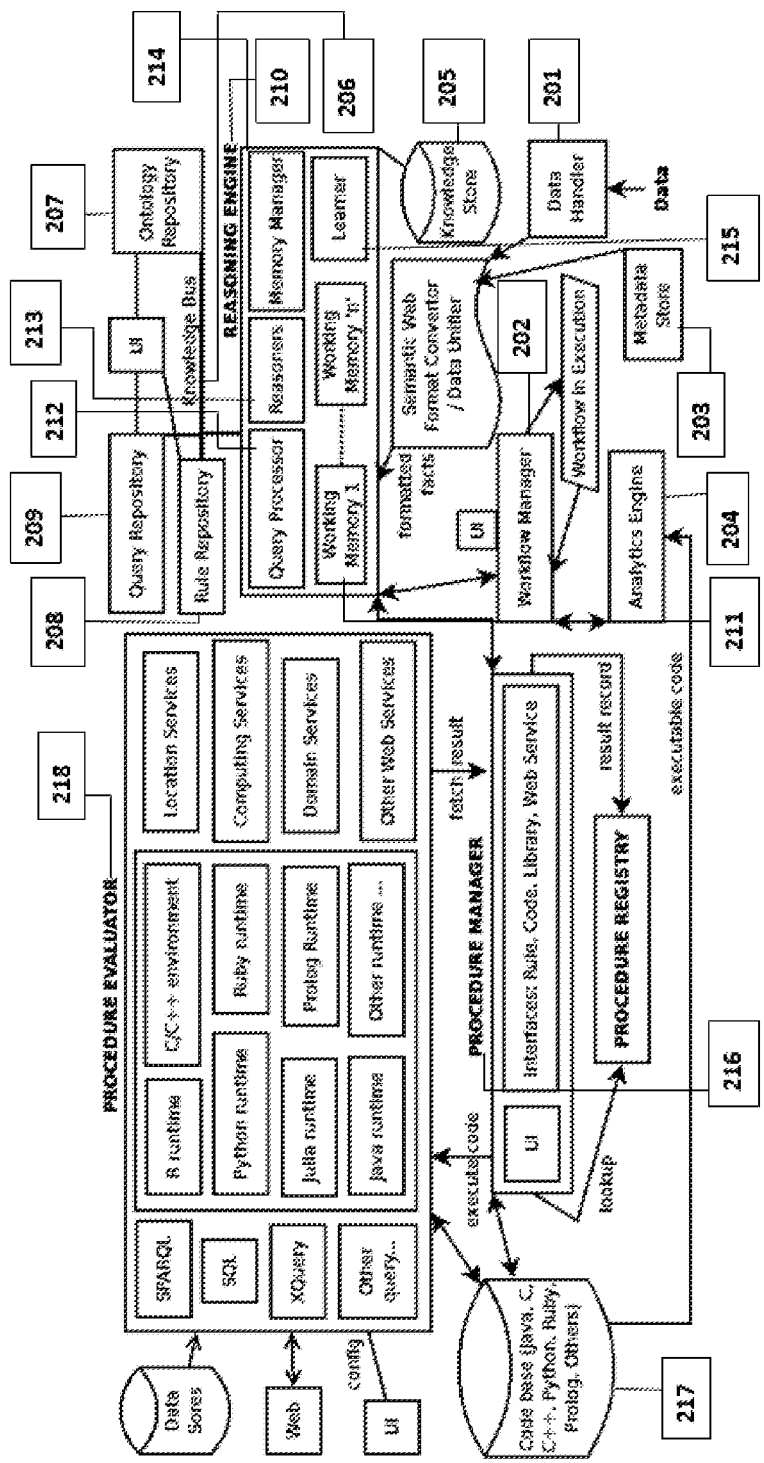
FIG. 2 is an architecture diagram depicting components and flow of the system for the extending of reasoning capability for data analytics in the IoT platform, in accordance with some embodiments of the present disclosure.

According to an embodiment of the present disclosure, by referring to FIG. 2, the architecture and flow of the system 100 for the extending of reasoning capability for data analytics in the IoT platform may be considered in detail. By referring to FIG. 2 again, it may be noted that the architecture comprises a Data Handler 201, a Workflow Manager 202, a Metadata Store 203, An Analytics Engine 204, a Knowledge Store 205, a Knowledge Bus 206, also hereinafter referred to as a Learning Module 206, An Ontology Repository 207, a Rule Repository 208, a Query Repository 209, a Reasoning Engine 210, one or more Working Memories 211, a Query Processor 212, a Reasoner 213, a Memory Manager 214, a Learner 215, a Procedure Manager 216, a Code Base 217, and a Procedure Evaluator 218.

The data handler 201 handles bursts of data when running in a live mode by using priority queues and checks any inconsistencies in data (for example, mismatched rows and columns). The workflow manager 202 comprises of a workflow engine (not shown in the figure) whose main task is to compose and execute data analytics workflows. The workflow manager 202 further controls a workflow instance in execution and may also enable to and fro data and control exchange between the analytics engine 204 and the reasoning engine 210. The metadata store 203 comprises of both specific and generic metadata around algorithms used for analytics. Also, metadata related to given dataset is used as a knowledge input at different stages of analysis.

The analytics engine 204 comprises a list of analytics algorithm instances (for example, drawn from machine learning and statistical analysis) and their mappings to specific data analytics task. The knowledge store 205 comprises of knowledge that is related to datasets, application, domain, workflow templates and algorithms. The knowledge may be in form of ontologies, facts like RDF (Resource Description Framework), formatted schematic files, flat files (such as 'csv' or comma separated values format) with tags or mappings for machine understanding of content, and the like. The knowledge bus 206 connects the Reasoning engine 210 to the different repositories, for example, the rule repository 208. The ontology repository 207 maintains a list of references to all ontology type knowledge files with description.

The rule repository 208 comprises all rules registered in the system via a rule registry (not shown in the figure), including procedural rules. The query repository 209 comprises queries which are used in order to view the inferences drawn via rule firing. The query repository 209 is further pre-filled with simple template SPARQL™ (SPARQL™ Protocol and RDF Query Language) like semantic queries which can be extended by user as per application demand. The reasoning engine 210 performs inter-alia supporting of procedural evaluation when firing rules, provision of apt workflow recommendation based on inferences drawn on given problem and dataset, and algorithm selection for each of the steps of a workflow in execution. The knowledge bus 206 connects the Reasoning engine 210 to the different repositories, for example, the rule repository 208. A Listener service is registered in the Knowledge Bus 206 that checks if any change occurs in any of the repositories. A provision is also kept to store inferred knowledge and facts in their apt repositories for future use.

The one or more working memories 211 comprise at least one dedicated memory to load all relevant facts and ontologies. The patterns of facts loaded in the one or more working memories 211 are based on the patterns existing in left hand side of rules (productions) and query expressions for a specified workflow execution. The query processor 212 supports ad-hoc query, which can be issued by users on demand to query the working memory for situations like result visualization, and registered queries, which are pattern seeking queries already linked to the working memory and trigger at regular intervals or on some condition satisfaction.

The reasoner 213 comprises a library of a pre-defined standard reasoner such as RDFS (Resource Description Framework Schema) or OWL (Web Ontology Language) reasoners, wherein logical inferences are fixed, and of custom reasoners made by binding custom rules including procedural rules to embed logic as per need. The memory manager 214 retrieves resources from various repositories via the Knowledge Bus. The memory manager 214 also manages the working memories and allocates and de-allocates memory areas to individual reasoner instances based on need.

The learner or the learning module 215 facilitates learning based on execution logs of the reasoner 213. The procedure manager 216 is the central control to manage procedural evaluations while reasoner is in execution. When a new procedural rule needs to be registered, the rule binding happens in the reasoner (implicit reasoner registry) while the procedure mapping happens in Procedure Registry.

The code base 217 comprises executable files. Support for various languages such as Java™, C/C++™ is kept as different languages, wherein different functionalities may be be leveraged, users usually have their own preference of languages, and different library of functions are available for each language and a specific required code library may be available only in one language. Finally, the procedure evaluator 218 is composed of runtime environments of different programming languages, where the values are passed and code gets executed. Connectivity to external databases such as 'DBPedia™' supporting queries via SPARQL, Structured Query Language (SQL) and other querying methods are maintained to link aptly at the time of procedural evaluation.

Figure 3:
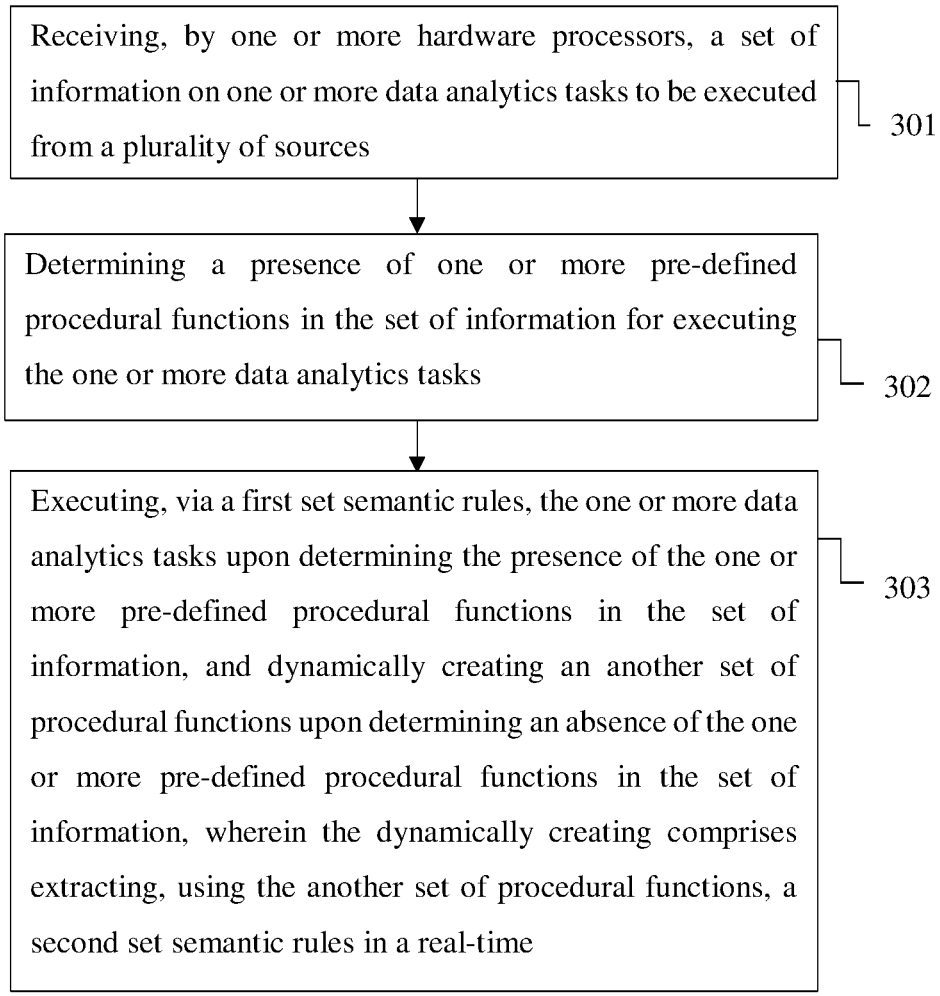
FIG. 3 is a flow diagram illustrating the steps involved in the process of extending the reasoning capability for data analytics in the IoT platform, in accordance with some embodiments of the present disclosure.

FIG. 3, with reference to FIG. 1 and FIG. 2, illustrates a flow diagram illustrating the steps involved in the process of extending the reasoning capability for data analytics in the IoT platform, in accordance with some embodiments of the present disclosure, in accordance with some embodiments of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein.

According to an embodiment of the present disclosure, at step 301, the one or more hardware processors 104 are configured to receive a set of information on one or more data analytics tasks to be executed from a plurality of sources. The set of information may comprise of codes from a plurality of programming languages, for example, Java™, C/C++™, Ruby™, Python™, Julia™, Prolog™, R™. Generally, each programming language has a different functionality that may be leveraged for executing the one or more data analytics tasks and different users usually have their own preference of languages. Further, different library of functions are available for each language and a specific required code library may be available only in one language.

In an embodiment, the plurality of sources from which the set of information may be received may comprise of (but not limited to) internet, databases, knowledge bases, and the like. Similarly, codes may be written by the user in a User Interface (UI) for executing the one or more data analytics tasks. Considering an example scenario, the set of information may be received as below in C™ language:

```
#include math.h
double root(double number) {
    return sqrt(number); }
```

According to an embodiment of the present disclosure, at step 302, the one or more hardware processors 104 are configured to determine a presence of one or more pre-defined procedural functions in the set of information for executing the one or more data analytics tasks. Generally, in order to solve a data analytics task, the user considers the problem (corresponding to the data analytics task), and then considers how to conceptualize a solution about it.

In general, the path taken to solve the problem may be thought of semantically connected steps, wherein a logic may be expressed as rules. The user further checks in a rule processing system, wherein one or more building blocks of rules (combining which a complete rule expression will be formed) exist in the system. If the one or more building blocks (that is, a functionalities) exist in the rule processing system, then the user composes a rule based on logical requirement of the task. Else, the user may be given a choice to add required procedural logic as building blocks of rules to be added to the system. The presence of the one or more pre-defined procedural functions may thus be determined in the received set of information.

In an example implementation, a rule using an existing procedure may be referred below, wherein a user may can refer to the procedural code already integrated in the system and ready for usage in rule body. The below rule attaches current time to triple creation matching a pattern at the time when the information is matched in working memory. In this case it is attaching a time to any new task completed, whose timestamp do not exist earlier.

```
[TimestampTaskRule: (?s <task:completion> ?taskName) .
noValue(?taskName, <taskTimeStamp>). now(?x)
-> (?taskName <taskTimeStamp> ?x)
```

Further, an example list of procedural rules (custom defined) for pre-processing of a sensor signal task may be as below, wherein 'c:resampleA' is a procedural rule name related to logical code for signal resampling added by user.

```
[ AutoResampleRule: (?data <data:hasSource> ?url ).
    (?data <problem:category> ?p).(?data <sig:samplingRateInHz> ?val1). (?data
<sig:upperBoundFreqInHz> ?val2)
    -> c:resampleA(?url, ?val1, ?val2, ?urln).
    (?p <task:completion> <sig:AutoResample>).
    (?data <data:newSource> ?urln) ]
```

The above procedural rule attempts to resample data using a custom algorithm. Resampling data to a lower rate without missing patterns is recommended to enable faster processing. The auto resampling algorithm takes in sampling rate and the upper frequency range with in which meaningful frequencies exist, resamples data to an optimal sampling rate. The procedural rule takes the data instance source, checks the problem tagging and sees if any facts about sampling rate and upper bound of frequency exists, calls the auto-resampling algorithm (c: is the initial prefix notation to denote custom procedural calls) coded and registered by user and outputs facts that task is completed as well link (or source) to processed data.

Still further, another procedural rule (procedural logic registered by user) example is as follows:

```
[ LowPassFilterRule: (?data <data:hasSource> ?url).
(?data <problem:category> ?p).(?p <sig:upperBoundFreqInHz> ?val)
-> c:lowpass(?url, ?val, ?urln).
(?p <task:completion> <sig:LowPassFilter>).
(?data <data:newSource> ?urln) ]
```

The above procedural rule comprising the custom function "c:lowpass" takes a data source, checks the problem tagging and sees if any domain knowledge of cutoff frequency exists, and next does a procedural call to low pass filter algorithm and gives out a link to processed data as well as adding a fact in working memory that lowpass filter operation is done. In this case, an available algorithm is used that is found in standard signal processing libraries of Matlab or Python. Hence it is showcased how symbolic and procedural knowledge based processing can be used conjointly for data analysis tasks.

According to an embodiment of the present disclosure, at step 303, the one or more hardware processors 104 are initially configured to execute, via a first set semantic rules, the one or more data analytics tasks upon determining the presence of the one or more pre-defined procedural functions in the set of information, wherein the first set semantic rules are extracted using the one or more pre-defined procedural functions.

In general, high-level programming languages comprise a built-in support for data structures and define a set of syntactic and semantic rules that define the structure of the language. When a slight change is made to a program written in a high-level language, a compiler, which transforms the program into object code by following a predetermined set of syntactic and semantic rules, either reflows the object code as necessary to correspond with the change made to the program or unabashedly informs a programmer of the apparent programming error.

The general format of each semantic rule is a set of conditions which are applied to a syntax parse tree node or logical form graph node and a list of actions that are applied to the syntax parse tree or logical form graph. Thus, upon determining the presence of the one or more pre-defined procedural functions in the set of information the first set semantic rules may be extracted for executing, the one or more data analytics tasks. By referring to examples shared in paragraph 37, the first set semantic rules extracted from the one or more pre-defined procedural functions may be referred.

According to an embodiment of the present disclosure, at step 303, the one or more hardware processors 104 are further configured to dynamically create another set of procedural functions upon determining an absence of the one or more pre-defined procedural functions in the set of information, wherein the another set of procedural functions comprise integrated procedural functions from the plurality of programming languages. Still further, the one or more hardware processors 104 are configured to extract a second set semantic rules in a real-time using the another set of procedural functions.

In an embodiment, the second set of semantic rules extend a reasoning capability for executing the one or more data analytics tasks in a plurality of IoT platforms. The process of dynamic creation of the another set of procedural functions, and thereby extending the reasoning capability by extracting the second set semantic rules from the another set of procedural functions in the light of the limitations faced by the traditional systems and methods may now be considered in detail.

Limitations faced by the traditional systems and methods and implementing the method disclosed to overcome the limitations—In general, an IoT workflow comprises data retrieval from sensors; pre-processing the data by applying various methods like formatting, noise cleaning and anomaly removal; applying data transformation to another representation form like Fourier Transform or Wavelet Transform; applying Feature Engineering principles of feature extraction from a region of interest followed by selecting features by application of a set of feature selection algorithms; finding a suitable Model for the data and problem post tuning modeling algorithm parameters; optional Inferencing step to derive high level deductions from discovered model; and Visualizing the results (in a way domain experts can understand).

All of the aforementioned steps need a repository of algorithms for each module and invocation as per requirements. The traditional approaches for IoT Analytics have thus confined themselves to quantitative analysis of the data based on the problem at hand. Further, different suites of algorithms are available in different programming language platforms and this leads to manual intervention or asynchronous and sequential analysis of IoT task(s). Also, a limited number of IoT based applications utilize semantic technologies or in general symbolic techniques of analysis.

The method disclosed attempts to overcome the above mentioned limitations faced by the traditional systems and methods. The method disclosed integrates the symbolic and quantitative techniques suitable for a typical IoT Analytics workflow execution, and separates the logic from generic procedures and storing them in rules, ontologies and knowledge stores. The method disclosed also provides for a seamless integration of procedural execution into the heart of reasoning following software engineering principles.

Further, the method disclosed provides for a dynamic extension of procedures (methods or functions) and procedural libraries without user(s) requiring to know the implementation and integration details. For example, a user knowing other programming language (like Java™) can write code of a functionality and the same will be added to function library of rules. Finally, a user knowing the intended use of a functionality implemented in some programming language can add the function to rule vocabulary registry without knowing the implementation details of the function.

According to an embodiment of the present disclosure, for the dynamic creation of the another set of procedural functions, the one or more hardware processors 104 initially parse the code (in the set of information) received in the step 301 to understand the language in which the received code has been generated, wherein the parsing may be performed by comparing with language construct template(s) stored in the system, wherein the system further comprises an attached execution environment for parsing the code.

The one or more hardware processors 104 then create a vector space representation of the code by taking a control flow graph structure, so that similar control flow codes with same numbered arguments and data types used may be mapped together. Thus, plurality of identical control flow codes from the plurality of programming languages may be mapped via the control flow graph structure and represented by the vector space representation.

When a new code is generated (from any programming language), the user may get some similarity score despite differences in exact variable and function names. Thus, the mapping facilitates generating a set of scores, wherein similar scores amongst the set of scores may increment if names, keywords and library functions used get are matching between two procedures (that is, procedural functions).

In an example implementation, a vector space representation is used to find out similarity between two procedures in terms of attributes of a procedure (function) such as name, keywords used, external functions used and internal control flow graph represented as matrix. One metric that can be used to find similarity is cosine similarity between vectors. It is important that different fields has different weights and overall influence on similarity. As an example, the following code snippet will be represented in vector space as shown in tabular form in FIG. 5.

```
int positive_increment(double d){
    if(d > 0){
        d = (int) d + 1;
        return d;
    }
    return 0;
}
```

By referring to Table 1 of FIG. 5, it may be noted that each column forms the co-ordinate axis for a n-dimensional vector space. In the example under consideration, the co-ordinate axis is a 6-dimensional vector space, as there are 6 fields. The sixth one is a reference to another vector of the adjacency matrix, wherein a similarity reference is calculated for that field.

The one or more hardware processors 104 compile the code, and reports an error if compilation fails. The one or more hardware processors 104 call new procedural functions (that is, the another set of procedural functions) with some different random values by its name from "main" type system procedure to check any run time faults. Considering an example scenario, as input to a "root" function (used as example) is double, so different values may be attempted in the value range of double data type as below:

```
int main( ){
    root(100);
}
```

The one or more hardware processors 104 create a Uniform Resource Identifier (URI) for the another set of procedural functions being added, with its programming language as a sub-part of the URI. The URI creation and assignment facilitates an identification of functions with same names amongst the another set of procedural functions based upon an identical name and an identical nomenclature. The one or more hardware processors 104 perform the URI assignment automatically using one or more pre-defined templates. Considering an example scenario, the URI may be created and assigned to a new procedural function as shown in example below:

http://com.tcs.algorepo/number/c/1/1/root wherein, 'number' is the domain identifier, 'c' represents programming language; first slashed '1' shows number of input arguments; next slashed '1' means number of declared return values; finally the name of the new procedural function.

The one or more hardware processors 104 create a field block and knowledge store entry to check a total number of accesses to the calling function (this is, updated on each call as a hit) to monitor popularity in collaborative platform. Another field may also be created to monitor average memory and time requirement the given function consumes. Considering an example scenario, the field block at initiation may be as:

|http://com.tcs.algorepo/number/c/1/1/root|hit—0|memory—0 MB|time—0 s|

In an embodiment, upon parsing the code, the one or more hardware processors 104 generate a semantic rule extension complaint function wrapper dynamically by extending a registry library of the another set of procedural functions, wherein the semantic rule extension complaint function wrapper is generated based upon the URI assignment. The values obtained by generating semantic rule extension complaint function wrapper may be passed as nodes and a return node reference may be used to generate the result.

Considering an example scenario, the semantic rule extension complaint function wrapper may be generated as (custom: root(36, val)), wherein a custom is a defined keyword permanently registered in a reasoning engine that calls other supporting functions. 22 is a node that is passed from the rule reasoner and 'val' is populated with the result (here 6) that can be used for other rule binding.

In an embodiment, upon generation of the semantic rule extension complaint function wrapper, a trailing number may be added to each function name (of the another set of procedural functions) and may also be further appended at the end of the parsed code for calling the new procedural function when writing the rule so that the user do not have to type the whole URI to refer to the code. This comes as an overlay in the UI when the new procedural function is used in a rule. Considering an example scenario, a root2, when two functions (may be expressed in different languages) already exist, which works as concatenation like: function name+previous counter value+increment by 1.

In an embodiment, the one or more hardware processors 104 parse and identify common resources (such as a memory area access, a file system, a database, a web service, external tools) required by the anther set of functions in their bodies. As in a rule system, since different rules may get triggered simultaneously, synchronization is important to avoid deadlock or starvation.

For synchronizing, the one or more hardware processors 104 parse same code with different instances or different executing codes to check if any common demand for resource along with interdependence exist. If the issue cannot be fixed by following template based rules, then the user may be alerted to take care of the issue. By referring to examples shared in paragraph 30, the another set of procedural functions created dynamically to facilitate extending reasoning capability for data analytics in the one or more IoT platforms may be referred.

According to an embodiment of the present disclosure, advantages of the method disclosed may be considered in detail. By implementing the method disclosed, a user knowing the intended use of a functionality implemented in some programming language can add the function to rule vocabulary registry without knowing the implementation details of the function. Also, by implementing the method disclosed, a platform is specified wherein user created functions (procedures) can be rated, shared and extended to for a collaborative development ecosystem, and wherein the functionality of added functions can be tested and validated, with feedback given to user.

The method disclosed allows chaining of existing functions with new ones for re-usability. Functions stored in the system are analyzed about their time and space requirements, frequency of usage, modification, extension and other details. The method disclosed may be integrated with external tools and web services for functionality extension.

Figure 4:
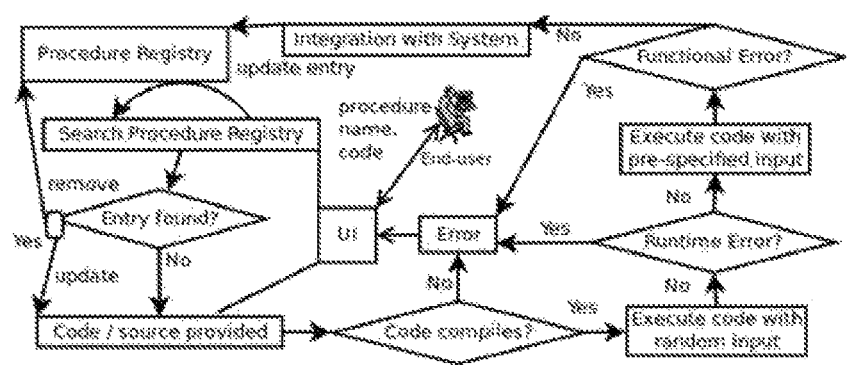
FIG. 4 illustrates an example of a method of registering a procedure by a user in a procedure registry, in accordance with some embodiments of the present disclosure.

The method disclosed facilitates a non-monotonic forward chaining deductive reasoning, thereby supporting a plurality of functional predicates to suit needs of a plurality of IoT workflows. Logic may be expressed both in form of semantic rules and SPARQL like graph pattern queries. External procedures in any supported programming language can be added to the system. By referring to FIG. 4, a method of registering a procedure by the user in a procedure registry may be referred. FIG. 4 shows how a user may register a procedure to be binded in a procedure registry. The user starts with searching for a procedure name in the existing registry and if entry found, can view the code if it is public and can update, modify or remove the same if access rights are granted. Else, the user creates a new entry of the procedure by linking or uploading code in language of choice.

The one or more hardware processors 104 checks (in a runtime environment) if the code gets compiled and executes code with random input to see if any runtime errors or exceptions happen. The one or more hardware processors 104 further communicates with the user to provide a set of inputs and expected output and check if the procedure yields functionally correct results. Next, the procedure gets integrated with the procedure registry and the user uses the function names and arguments in defining custom rules. Any errors in the process are shown to the user for rectification.

Finally, the user may perform below functions in the UI by implementing the method disclosed:
Updating/adding/removing custom functions (algorithmic methods);
Sharing functions with all users or a group or keeping it private;
Viewing source code or other implementation details of shared functions with apt permissions;
Commenting, rating and providing suggestions for different registry functions;
Tag the self-created functions with meaningful meta-data; and
In a particular session, users can turn on and off certain functions. This facilitates overriding of functions like the different interpretations of a function bearing the same name.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of the extending of reasoning capability for data analytics in the IoT platform. The embodiment, thus provides for a dynamically creating the another set of procedural functions upon determining an absence of the one or more pre-defined procedural functions. Moreover, the embodiments herein further provides extracting, using the another set of procedural functions, a second set semantic rules in a real-time, wherein the second set of semantic rules extend a reasoning capability for executing the one or more data analytics tasks in the plurality of IoT platforms.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for extending reasoning capability for data analytics in Internet of Things (IoT) platform, the method comprising:
   receiving, by one or more hardware processors, a set of information on one or more data analytics tasks to be executed from a plurality of sources (301);
   determining, by the one or more hardware processors, a presence of one or more pre-defined procedural functions in the set of information for executing the one or more data analytics tasks (302);
   performing, based upon the determining, one of (303):
      executing, via a first set semantic rules, the one or more data analytics tasks upon determining the presence of the one or more pre-defined procedural functions in the set of information, wherein the first set semantic rules are extracted using the one or more pre-defined procedural functions; and
      dynamically creating an another set of procedural functions upon determining an absence of the one or more pre-defined procedural functions in the set of information, wherein the another set of procedural functions comprise integrated procedural functions from a plurality of programming languages, and wherein the dynamically creating comprises:
         assigning, using one or more pre-defined templates, a Uniform Resource Identifier (URI) to each of the another set of procedural functions to identify one or more functions with an identical name; and
         extracting, using the another set of procedural functions, a second set semantic rules in a real-time, wherein the second set of semantic rules extend a reasoning capability for executing the one or more data analytics tasks in a plurality of IoT platforms, wherein extracting the second set semantic rules comprises generating, using the assigned URI, a semantic rule extension compliant function wrapper for executing the one or more data analytics tasks in the plurality of IoT platforms.

2. The method as claimed in claim 1, wherein the step of extracting the second set semantic rules is preceded by generating, using the set of information, a set of scores by mapping a plurality of identical control flow codes from the plurality of programming languages.

3. The method as claimed in claim 2, wherein the each of the plurality of identical control flow codes are represented by a vector space representation technique for determining the presence of the one or more pre-defined procedural functions.

4. A system (100) for extending reasoning capability for data analytics in Internet of Things (IoT) platform, the system (100) comprising:
   a memory (102) storing instructions;
   one or more communication interfaces (106); and
   one or more hardware processors (104) coupled to the memory (102) via the one or more communication interfaces (106), wherein the one or more hardware processors (104) are configured by the instructions to:
      receive a set of information on one or more data analytics tasks to be executed from a plurality of sources;
      determine a presence of one or more pre-defined procedural functions in the set of information for executing the one or more data analytics tasks;
      perform, based upon the determining, one of:
         execute, via a first set semantic rules, the one or more data analytics tasks upon determining the presence of the one or more pre-defined procedural functions in the set of information, wherein the first set semantic rules are extracted using the one or more pre-defined procedural functions; and
         dynamically create an another set of procedural functions upon determining an absence of the one or more pre-defined procedural functions in the set of information, wherein the another set of procedural functions comprise integrated procedural functions from a plurality of programming languages, and wherein the dynamically creating comprises:
            assign, using one or more pre-defined templates, a Uniform Resource Identifier (URI) to each of the another set of procedural functions to identify one or more functions with an identical name; and
            extract, using the another set of procedural functions, a second set semantic rules in a real-time, wherein the second set of semantic rules extend a reasoning capability for executing the one or more data analytics tasks in a plurality of IoT platforms, wherein extracting the second set semantic rules comprises generating, using the assigned URI, a semantic rule extension complaint function wrapper for executing the one or more data analytics tasks in the plurality of IoT platforms.

5. The system (100) as claimed in claim 4, wherein the one or more hardware processors (104) are configured to generate, using the set of information, a set of scores by mapping a plurality of identical control flow codes from the plurality of programming languages for extracting the second set semantic rules.

6. The system (100) as claimed in claim 5, wherein the one or more hardware processors (104) are configured to represent, by a vector space representation technique, the plurality of identical control flow codes for determining the presence of the one or more pre-defined procedural functions.

7. A computer program product comprising a non-transitory computer readable medium having a computer readable program embodied therein, wherein the computer readable program, when executed on a computing device, causes the computing device to:

receive, by one or more hardware processors, a set of information on one or more data analytics tasks to be executed from a plurality of sources (301);

determine, by the one or more hardware processors, a presence of one or more pre-defined procedural functions in the set of information for executing the one or more data analytics tasks (302);

perform, based upon the determining, one of (303):

execute, via a first set semantic rules, the one or more data analytics tasks upon determining the presence of the one or more pre-defined procedural functions in the set of information, wherein the first set semantic rules are extracted using the one or more pre-defined procedural functions; and dynamically create an another set of procedural functions upon determining an absence of the one or more pre-defined procedural functions in the set of information, wherein the another set of procedural functions comprise integrated procedural functions from a plurality of programming languages, and wherein the dynamically creating comprises:

assign, using one or more pre-defined templates, a Uniform Resource Identifier (URI) to each of the another set of procedural functions to identify one or more functions with an identical name; and extract, using the another set of procedural functions, a second set semantic rules in a real-time, wherein the second set of semantic rules extend a reasoning capability for executing the one or more data analytics tasks in a plurality of IoT platforms, wherein extracting the second set semantic rules comprises generating, using the assigned URI, a semantic rule extension complaint function wrapper for executing the one or more data analytics tasks in the plurality of IoT platforms.

\* \* \* \* \*